US012567678B2

(12) United States Patent
Snygg et al.

(10) Patent No.: US 12,567,678 B2
(45) Date of Patent: Mar. 3, 2026

(54) SUBARRAY ANTENNA ADAPTED TO BE MOUNTED TO OTHER SUBARRAY ANTENNAS, AND AN ARRAY ANTENNA FORMED BY SUCH SUBARRAY ANTENNAS

(71) Applicant: Telefonaktiebolaget LM Ericsson (publ), Stockholm (SE)

(72) Inventors: Göran Snygg, Partille (SE); Ingmar Andersson, Lindome (SE); Kim Nordqvist, Västra Frölunda (SE); Ola Tageman, Gothenburg (SE); Anders Martinsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 134 days.

(21) Appl. No.: 18/029,024

(22) PCT Filed: Sep. 29, 2020

(86) PCT No.: PCT/EP2020/077201

§ 371 (c)(1),
(2) Date: Mar. 28, 2023

(87) PCT Pub. No.: WO2022/069017

PCT Pub. Date: Apr. 7, 2022

(65) Prior Publication Data

US 2023/0361479 A1 Nov. 9, 2023

(51) Int. Cl.
*H01Q 21/00* (2006.01)

(52) U.S. Cl.
CPC ..... *H01Q 21/0025* (2013.01); *H01Q 21/0087* (2013.01)

(58) Field of Classification Search
None
See application file for complete search history.

(56) References Cited

U.S. PATENT DOCUMENTS

2004/0201543 A1* 10/2004 Gottl .................... H01Q 1/1207 343/912
2010/0066631 A1* 3/2010 Puzella ................ H01Q 9/0414 29/601

(Continued)

FOREIGN PATENT DOCUMENTS

CN 1226344 A 8/1999
CN 2694517 Y 4/2005

(Continued)

OTHER PUBLICATIONS

International Search Report and Written Opinion dated Jun. 16, 2021 issued in International Patent Application No. PCT/EP2020/077201 (11 pages).

(Continued)

*Primary Examiner* — Dameon E Levi
*Assistant Examiner* — Anh N Ho
(74) *Attorney, Agent, or Firm* — Rothwell, Figg, Ernst & Manbeck, P.C.

(57) ABSTRACT

The present disclosure relates to a sub array antenna (101*a*, 101*b*, 101*c*) adapted to be mounted to at least one other sub array antenna (101*a*, 101*b*, 101*c*) along at least one extension (E1, E2) to form an array antenna (100). The sub array antenna (101*a*, 101*b*, 101*c*) comprises an electrically conducting ground plane (102*a*, 102*b*, 102*c*) and at least one edge part (104*a*, 105*a*; 104*b*, 105*b*; 104*c*, 105*c*) that is adapted to face an edge part of an adjacent sub array antenna. The edge part (104*a*, 105*a*; 104*b*, 105*b*; 104*c*, 105*c*) at least partly comprises a locking structure comprising an outer lock part (103*a*, 103*b*) and an indent (106*a*, 106*b*) that is positioned between the outer lock part (103*a*, 103*b*) and the ground plane (102*a*, 102*b*, 102*c*) in a direction of the extension (E1, E2). The indent (106*a*, 106*b*) is adapted to receive an adjacent outer lock part (103*b*, 103*a*) of an adjacent sub array antenna (101*b*, 101*a*), and the outer lock (Continued)

part (103*b,* 103*a*) is adapted to engage an indent (106*b,* 106*a*) of an adjacent sub array antenna (101*b,* 101*a*). The outer lock part (103*b,* 103*a*) and the indent (106*a,* 106*b*) are electrically conducting and electrically connected to the ground plane (102*a,* 102*b*).

18 Claims, 5 Drawing Sheets

(56) References Cited

U.S. PATENT DOCUMENTS

| | | | | |
|---|---|---|---|---|
| 2013/0321229 | A1 | 12/2013 | Klefenz et al. | |
| 2020/0058986 | A1 * | 2/2020 | Dorsey | H01Q 21/061 |
| 2021/0083399 | A1 * | 3/2021 | Mccordic | H01Q 1/02 |

FOREIGN PATENT DOCUMENTS

| | | | | |
|---|---|---|---|---|
| CN | 101375466 | A | | 2/2009 |
| CN | 110752450 | A | | 2/2020 |
| JP | H056921 | U | * | 1/1993 |

OTHER PUBLICATIONS

Wang, C. et al., “A low complexity dynamic subarray combination method for MIMO transmitter”, The National Natural Science Foundation of China (No. 61372093, No. 61401130) Jun. 4, 2020 (11 pages).

* cited by examiner

SUBARRAY ANTENNA ADAPTED TO BE MOUNTED TO OTHER SUBARRAY ANTENNAS, AND AN ARRAY ANTENNA FORMED BY SUCH SUBARRAY ANTENNAS

CROSS REFERENCE TO RELATED APPLICATIONS

This application is a 35 U.S.C. § 371 National Stage of International Patent Application No. PCT/EP2020/077201, filed Sep. 29, 2020.

TECHNICAL FIELD

The present disclosure relates to subarray antennas adapted to be mounted to each other, and an array antenna formed by such subarray antennas. Each subarray antenna comprises an electrically conducting ground plane and at least one edge part that is adapted to face an edge part of an adjacent subarray antenna.

BACKGROUND

There is a general demand in increased data capacity in the digital communication networks globally. Today many 5G networks use phased arrays, but there are also solutions for 4G. The trend is that the arrays are getting bigger and bigger with an increased number of antenna elements; for future 6G networks there are discussions about arrays with more than 1000 antenna elements. Due to lack of bandwidth there is also a desire to use higher and higher frequencies. 5G is already today using for example 28 GHz and 39 GHz, and 47 GHz and possibly higher bands are considered as well. For 6G, frequencies around and above 100 GHz are considered.

To limit the number of antennas in the networks, a relative high beam steering is considered. Beam steering in azimuth ±60° is likely. This will require a small element-to-element distance to avoid so called grating lobes, and with ±60° beam steering in azimuth, an element distance of about a half wavelength is needed. In elevation, however, the beam steering is limited to +/−150 in many use cases, thus relaxing the element-to-element distance somewhat.

There is a desire to lower the cost, resulting in that it becomes more and more common to integrate the antenna elements into packages and other types of subarray antennas that are combined to bigger arrays.

Similar challenges exist in the backhaul network and to some degree even worse, as traditional backhaul frequencies are moved to 5G and 6G applications, leading to increased backhaul frequencies. Higher frequencies in backhaul generally results in narrower antenna lobes which will make it more challenging to install the antenna and to keep the antenna steady. Most likely some type of beam tracking will be needed in the future for high gain high frequency backhaul networks. By having a small array feeding a parabolic antenna, some beam adjustment could be done during installation as well as during operation.

When designing a larger total array antenna using smaller subarray antennas, there will be discontinuities in the antenna ground that could cause major problems with the antenna performance.

Some problems are due to resonances on multiples of half wave length.

These could radiate.

These could create notches in the frequency plan.

The distance between the slots are relative long, several half wavelengths, therefore these could generate grating lobes.

Keeping good cross polarization becomes more difficult.

Parallel plate modes can occur which distribute RF power between antenna elements in an unpredictable manner.

Other problems are due to that the antenna elements also will excite the edge parts, and that there is no control of the grounding of the common antenna ground plane, and the related ground currents, between the subarray antennas.

A further problem when using multiple subarray antennas to build a larger total array antenna is that the alignment between the subarray antennas needs to be good, otherwise there will be a detrimental impact on the antenna patterns and the polarization purity. For example, when soldering subarray antenna components, there can be a small misalignment, and many of these misalignments can add together to a total undesired error over the total array antenna. There could also be a misalignment in height, resulting in that the ground plane level of the total array antenna can be different for the different subarray antennas. This misalignment may affect the radiation pattern and also excite the ground plan edge parts.

Even relatively small offsets between adjacent subarray antennas can result in a relatively large difference in the electrical environment. All of sudden, there can be pointwise ground connections, and as these connections will be unpredictable, they can have a major impact on antenna patterns etc.

There can also be a misalignment in height, so the ground plan level could be different for the different subarray antennas in the total array antenna. It is therefore desired to counteract these problems.

SUMMARY

It is an object of the present disclosure to provide means for mounting subarray antennas to each other while maintaining a continuous and leveled ground plane for the formed array antenna.

This object is obtained by means of a subarray antenna adapted to be mounted to at least one other subarray antenna along at least one extension to form an array antenna. The subarray antenna comprises an electrically conducting ground plane and at least one edge part that is adapted to face an edge part of an adjacent subarray antenna. The edge part at least partly comprises a locking structure comprising an outer lock part and an indent that is positioned between the outer lock part and the ground plane in a direction of the extension. The indent is adapted to receive an adjacent outer lock part of an adjacent subarray antenna, and the outer lock part is adapted to engage an indent of an adjacent subarray antenna. The outer lock part and the indent are electrically conducting and electrically connected to the ground plane.

In this way, discontinuation in the antenna ground plan in an array that consists of a number of subarray antennas is mitigated. This will reduce the risk for uncontrolled radiation from an array antenna since the risk for exciting the edges of the subarray antennas is eliminated. Thereto, the alignment of the subarray antennas will be improved. These features will also help to improve the antenna radiation pattern. Especially for higher frequencies, such as for example 100 GHz, this is advantageous since the sensitivity for ground plane discontinuations increases with increasing frequency and may limit the array performance a lot.

According to some aspects, the subarray antenna comprises a first type edge part and a second type edge part, where the first type edge part comprises a first type locking structure that is adapted to engage a second type locking structure that is comprised in the second type edge part.

In this way, a secure mounting is provided.

According to some aspects, the outer lock part comprises a slanted side that faces the indent.

In this way, movement in a direction that is perpendicular to the at least one extension is prevented, perpendicular to the extension of the ground plane. This results in that the mounting of subarray antenna even more surely will result in an even ground plane that runs in a common level.

According to some aspects, each edge part comprises at least one protrusion that extends away from the edge part and at least one notch that extends in the opposite direction, each protrusion being adapted to engage a corresponding notch in an adjacent subarray antenna and each notch being adapted to engage a corresponding protrusion in an adjacent subarray antenna.

In this way, a secure mounting that provides a continuous ground plane is provided.

According to some aspects, the ground plane is formed in a piece of metal, and the edge part is formed in the same piece of metal. Alternatively, according to some aspects, the ground plane is in the form of a metallization on a dielectric material where the edge part is formed in the dielectric material and at least partly comprises a metallization.

This means that the mounting arrangement according to the present disclosure is applicable for many different types of antenna types.

This object is also obtained by means of an array antenna and a method which are associated with the above advantages.

BRIEF DESCRIPTION OF THE DRAWINGS

The present disclosure will now be described more in detail with reference to the appended drawings, where.

DETAILED DESCRIPTION

Figure 1:
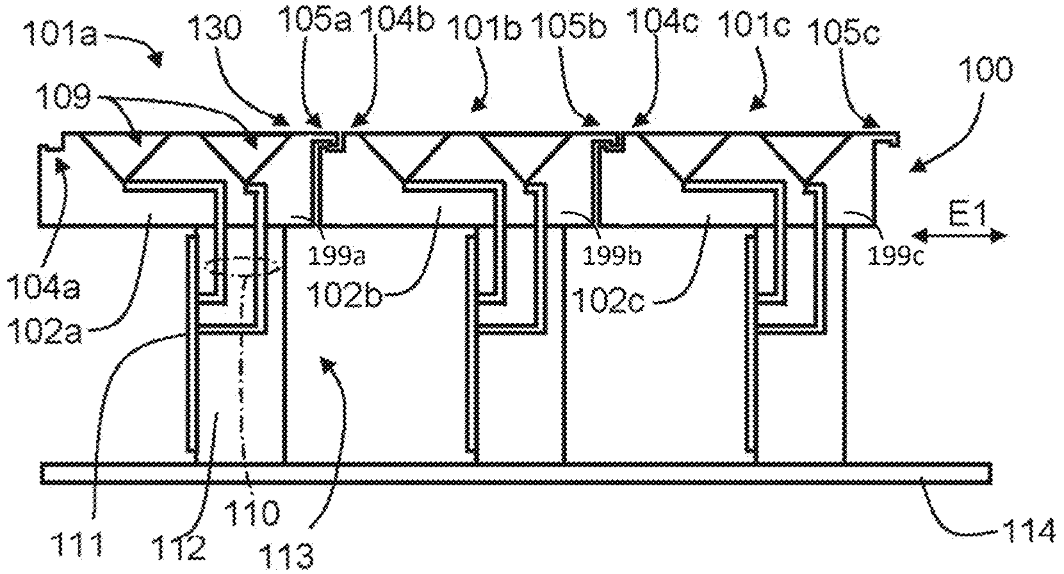
FIG. 1 schematically shows a cut-open side view of an array antenna according to a first example with horn antennas.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1 that schematically shows a cut-open side view of a first example of an array antenna 100, the array antenna 100 is constituted by a number of subarray antennas 101*a*, 101*b*, 101*c*. In FIG. 1, three subarray antennas 101*a*, 101*b*, 101*c* are shown; a first subarray 101*a*, a second subarray antenna 101*b* and a third subarray antenna 101*c* which are mounted to each other along a first extension E1. In practice there are normally more subarray antennas which the form rows and columns. With reference to also FIG. 3, the subarray antennas 101*a*, 101*b*, 101*c*; 101*d*, 101*e*, 101*f* form two rows 310, 320 along a second extension E2 with three subarray antennas 101*a*, 101*b*, 101*c*; 101*d*, 101*e*, 101*f* in each row 310, 320.

Only being described for a first subarray antenna 101*a* in FIG. 1, but being applicable for all subarray antennas 101*a*, 101*b*, 101*c*; 101*d*, 101*e*, 101*f*, according to some aspects, each subarray antenna 101*a*, 101*b*, 101 is an active subarray antenna that comprises one or more antenna elements 109 where each antenna element 109 is fed by a feeding arrangement 110, which in turn is connected to a radio circuit 111 mounted to a heat-sink 112 in a radio arrangement 113. The radio arrangement 113 is mounted to a printed circuit board (PCB) 114, and electrically connected to conductors in the PCB 114. In this way, each subarray antenna 101*a*, 101*b*, 101*c*; 101*d*, 101*e*, 101*f* can DC current supply and both receive and send control signaling and signal data by means of the PCB conductors (not shown). The PCB conductors are connected to other suitable circuitry in a well, known manner such that a radio unit may be formed. The subarray antennas 101*a*, 101*b*, 101*c*; 101*d*, 101*e*, 101*f* are suitable mounted to the PCB 114 by means of pick-and place techniques and a reflow process in a previously well-known manner.

Here, the antenna elements 109 are in the form of horn antennas formed in a piece of metal 102*a*, 102*b*, 102*c* forming a ground plane and having a main body 199*a*, 199*b*, 199*c*. It is desired to connect each subarray antenna 101*a*, 101*b*, 101*c*; 101*d*, 101*e*, 101*f* to an adjacent subarray antenna in such a way that a coherent total ground plane 130 is formed, without slots that form discontinuations in the total ground plane 130. Such slots can for example be due to non-linear mounting as well as variations of ground plane level for each subarray antenna, which in turn can be due to errors in the assembly and reflow processes. Even what could seem like a small offset of a subarray could be a big difference in the electrical environmental. All of sudden there could be only pointwise ground connections between the ground planes 102*a*, 102*b*, 102*c*. As these connections will be unpredictable they could be of major impact for antenna patterns etc.

Each subarray antenna 101*a*, 101*b*, 101 comprises least one edge part 104*a*, 105*a*; 104*b*, 105*b*; 104*c*, 105*c* that is adapted to face an edge part of an adjacent subarray antenna. Edge parts 105*a*, 105*b*, and 105*c* extend in a direction from the respective main body 199*a*, 199*b*, 199*c* as illustrated in FIG. 1. According to the present disclosure, the edge part 104*a*, 105*a*; 104*b*, 105*b*; 104*c*, 105*c* at least partly comprises a locking structure that is shown in more detail in FIG. 2A that illustrates adjacent edge parts 105*a*, 104*b* between the first subarray antenna 101*a* and the second subarray antenna 101*b*, where a first edge part 105*a* is formed in a first ground plane 102*a* of the first subarray antenna 101*a*, and where a second edge part 105*b* is formed in a second ground plane 102*b* of the second subarray antenna 101*b*.

Figure 2A:
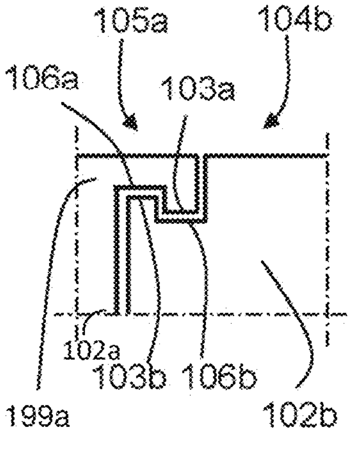
FIG. 2A schematically shows a first type of locking structure for the array antenna according to the first example.

Each locking structure comprises an outer lock part 103*a*, 103*b* and an indent 106*a*, 106*b* that is positioned between the outer lock part 103*a*, 103*b* and the ground plane 102*a*, 102*b*, 102*c* in a direction of the extension E1. As illustrated in FIG. 2A, an indent 106*a* of the first ground plane 102*a* is positioned between the outer lock part 103*a* and the corresponding main body 199*a* and is adapted to receive an adjacent outer lock part 103*b* of the second ground plane, and an indent 106*b* of the second ground plane 102*b* is adapted to receive an adjacent outer lock part 103*a* of the first ground plane 102. More generally, an indent 106*a*, 106*b* is adapted to receive an adjacent outer lock part 103*b*, 103*a* of an adjacent subarray antenna 101*b*, 101*a*, and the outer lock part 103*b*, 103*a* being adapted to engage an indent 106*b*, 106*a* of an adjacent subarray antenna 101*b*, 101*a*. Also, in general, the outer lock part 103*b*, 103*a* and the indent 106*a*, 106*b* are electrically conducting and electrically connected to the ground plane 102*a*, 102*b*.

Figure 2B:
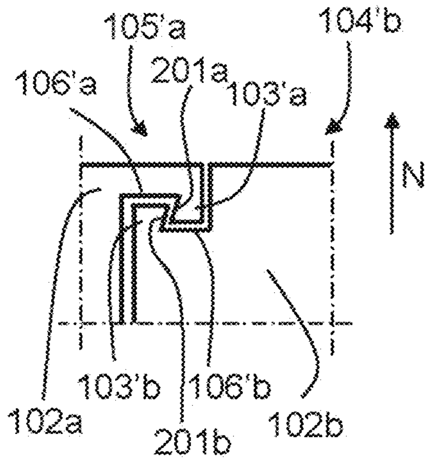
FIG. 2B schematically shows a second type of locking structure for the array antenna according to the first example.

According to some aspects and as illustrated in FIG. 1, each subarray antenna 101*a*, 101*b*, 101*c* comprises a first type edge part 104*a*, 104*b*, 104*c* and second type edge part 105*a*, 105*b*, 105*c* where, as illustrated for the first subarray antenna 101*a* and the second subarray antenna 101*b* in FIG. 2B, the first type edge part 104*b* comprises a first type locking structure 103*b*, 106*b* that is adapted to engage a second type locking structure 103*a*, 106*a* that is comprised in the second type edge part 105*c*.

According to some aspects, the first type locking structure 103*b*, 106*b* comprises an indent 106*b* that is facing away from the PCB 114 when the subarray antenna 101*a*, 101*b*, 101*c* is mounted to the PCB 114, and the second type locking structure 103*a*, 106*a* comprises an indent 106*a* that is facing towards the PCB 114 when the subarray antenna 101*a*, 101*b*, 101*c* is mounted to the PCB 114. According to some aspects, each locking structure 103*a*, 106*a*; 103*b*, 106*b* is hook-shaped.

According to some aspects, with reference to FIG. 2B, the edge parts 105'*a*, 104'*b* comprises lock parts 103'*b*, 103'*a* where each outer lock part 103'*b*, 103'*a* comprises a slanted side 201*a*, 201*b* that faces the indent 106'*a*, 106'*b* such that a width of the outer lock part 103'*b*, 103'*a* increases away from the indent 106'*a*, 106'*b*. This means that when two locking structure 103*b*, 106*b* are connected to each other, the slanted sides 201*a*, 201*b* of the outer lock parts 103*b*, 103*a* engage each other such then when mounted, movement in a direction N that is perpendicular to the extensions E1, E2, and to the total ground plane 130 is prevented. This results in that the mounting of subarray antenna 101*a*, 101*b*, 101*c* even more surely will result in an even ground plane that runs in a common level.

Figure 3:
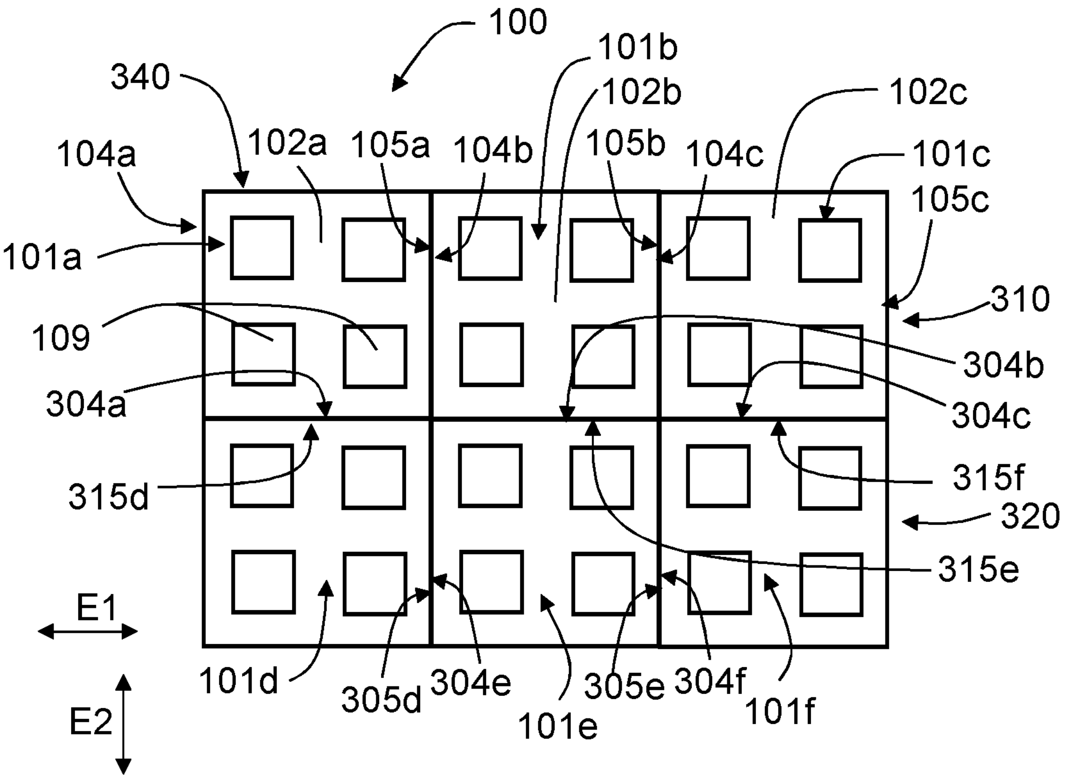
FIG. 3 schematically shows a front view of a first type of the array antenna according to the first example.

As mentioned initially, FIG. 3 shows six subarray antennas 101*a*, 101*b*, 101*c*; 101*d*, 101*e*, 101*f* that form two rows 310, 320 along a second extension E2 with three subarray antennas 101*a*, 101*b*, 101*c*; 101*d*, 101*e*, 101*f* in each row 310, 320. Everywhere where there are adjacent edges, edge part are connected to each other by means of the locking structures. More in detail, in each row 310, 320, the edge parts 105*a*, 104*b*; 105*b*, 104*c*; 105*d* 104*e*; 105*e*, 104*f* are connected, and the rows 310, 320 are connected to each other by means of corresponding edge parts 304*a*, 315*d*; 304*b*, 315*e*; 304*c*, 315*f*. Especially in the case of the locking structures being of the kind according to FIG. 2B, the edge parts are suitably slid together. For this purpose, according to some aspects, longitudinally running edge parts of rows and columns that form the array antenna 100 have locking parts of the same type such that sliding is admitted.

Figure 4A:
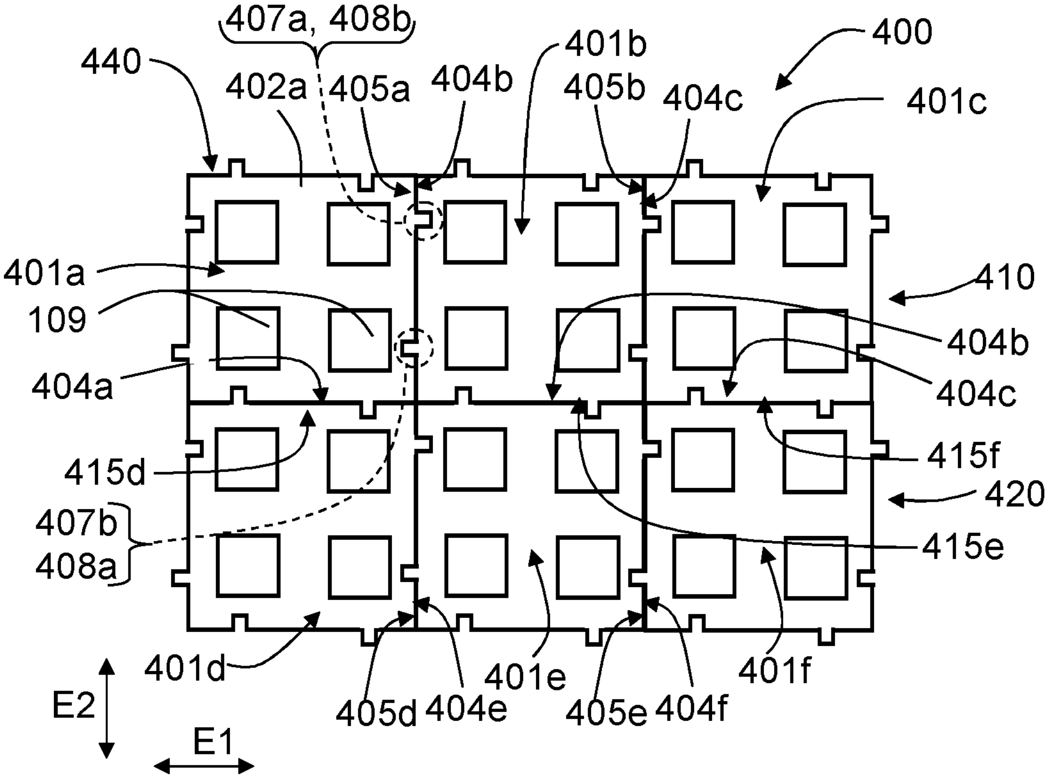
FIG. 4A schematically shows a front view of a second type of the array antenna according to the first example, having co-operating protrusions and notches along the edges.

According to some aspects, with reference to FIG. 4A that mainly corresponds to FIG. 3, there is an alternative array antenna 400. Six subarray antennas 401*a*, 401*b*, 401*c*; 401*d*, 401*e*, 401*f* that form two rows 410, 420 along the second extension E2 with three subarray antennas 401*a*, 401*b*, 401*c*; 401*d*, 401*e*, 401*f* in each row 410, 420. In each row 410, 420, the edge parts 405*a*, 404*b*; 405*b*, 404*c*; 405*d*, 404*e*; 405*e*, 404*f* are connected, and the rows 410, 420 are connected to each other by means of corresponding edge parts 404*a*, 415*d*; 404*b*, 415*e*; 404*c*, 415*f*. In the following, the edge parts 405*a*, 404*b* that connect the first subarray antenna 401*a* to the second subarray antenna 401*b* will be discussed, but of course the same arrangement is applicable for all edge parts.

Figure 4B:
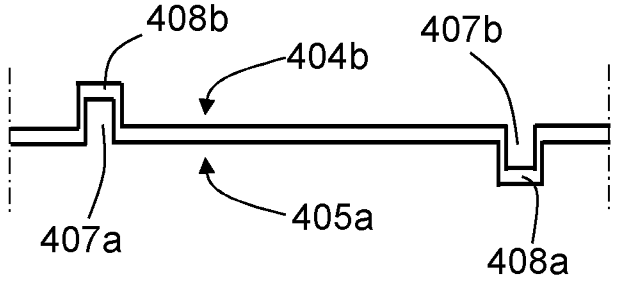
FIG. 4B schematically shows a detail of FIG. 4A, illustrating co-operating protrusions and notches.

With reference also to FIG. 4B, showing a detail of FIG. 4A, according to some aspects, the first edge part 405*a* comprises one protrusion 407*a* that extends away from the edge part and one notch 408*a* that extends in the opposite direction. In the same manner, the second edge part 404*b* comprises one protrusion 407*b* that extends away from the edge part and one notch 408*b* that extends in the opposite direction. When the edge parts are mounted to each other, the protrusions 407*a*, 407*b* are positioned opposite a notch 408*a*, 408*b* of the opposing edge part such that each protrusion 407*a*, 407*b* is adapted to engage a corresponding notch 408*a*, 408*b* in the adjacent subarray antenna, and each notch 408*a*, 408*b* is adapted to engage a corresponding protrusion 407*a*, 407*b* in the adjacent subarray antenna.

This prevents movements along the first extension E1 and the second extension E2 since the protrusions 407*a*, 407*b* and notches 408*a*, 408*b* locally take the place of the locking structures 103*a*, 103*b*; 106*a*, 106*b* along the edge parts 405*a*, 404*b* and engage each other in an interleaving manner in a direction that is perpendicular to the extension of the edge parts 405*a*, 404*b*.

In the above, a first example of an active array antenna has been described with antenna elements formed as horn antennas in metal where the edge parts 104*a*, 105*a*; 104*b*, 105*b*; 104*c*, 105*c* are formed in the same piece of metal. A metalized non-conducting material can of course be used instead. The present disclosure is generally intended for all types of ground planes that are to be connected in a coherent manner, and in the following a second example of an array antenna will be described with reference to FIG. 5 that schematically shows a cut-open side view of a second example of an array antenna 500.

Figure 5:
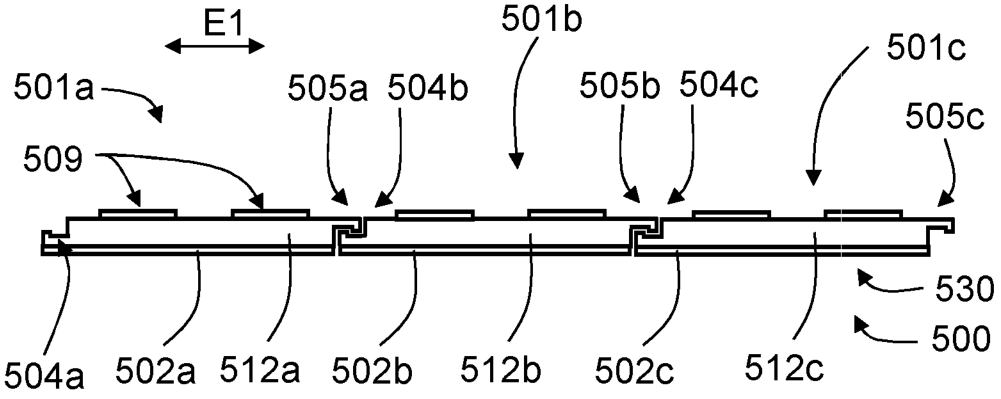
FIG. 5 schematically shows a cut-open side view of an array antenna according to a second example with microstrip patch antennas.

The array antenna 500 is constituted by a number of subarray antennas 501*a*, 501*b*, 501*c*. In FIG. 5, three subarray antennas are shown; a first subarray 501*a*, a second subarray antenna 5501*b* and a third subarray antenna 501*c* which are mounted to each other along a first extension E1. In practice there are normally more subarray antennas which the form rows and columns. With reference to also FIG. 7, the subarray antennas 501*a*, 501*b*, 501*c*; 501*d*, 501*e*, 501*f* form two rows 710, 720 along a second extension E2 with three subarray antennas 501*a*, 501*b*, 501*c*; 501*d*, 501*e*, 501*f* in each row 710, 720.

Here each subarray antenna 501*a*, 501*b*, 501*c* comprises a plurality of antenna elements 509 in the form of patch elements that are formed as metallizations on a dielectric material 512*a*, 512*b*, 512*c*. Each subarray antenna 501*a*, 501*b*, 501*c* comprises a ground plane 502*a*, 502*b*, 502*c* that is in the form of a metallization on the dielectric material 512*a*, 512*b*, 512*c*, where the ground plane 502*a*, 502*b*, 502*c* is formed on an opposite side of the dielectric material 512*a*, 512*b*, 512*c* relative the antenna elements 509.

Figure 6A:
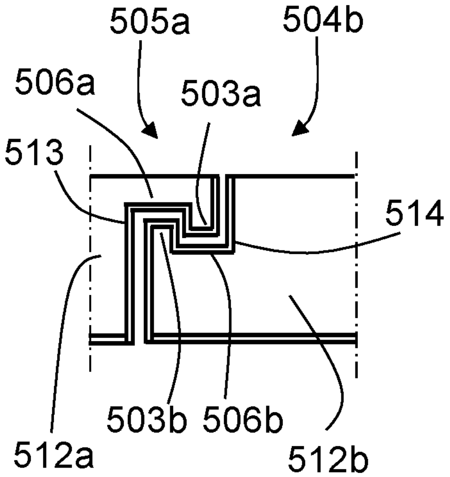
FIG. 6A schematically shows a first type of locking structure for the array antenna according to the second example.

Each subarray antenna 501*a*, 501*b*, 501 comprises least one edge part 504*a*, 505*a*; 504*b*, 505*b*; 504*c*, 505*c* that is adapted to face an edge part of an adjacent subarray antenna. In accordance with the present disclosure, in the same way as for the first example, the edge part 504*a*, 505*a*; 504*b*, 505*b*; 504*c*, 505*c* at least partly comprises a locking structure that is shown in more detail in FIG. 6A that illustrates adjacent edge parts 505*a*, 504*b* between the first subarray antenna 501*a* and the second subarray antenna 501*b*, where, for the first subarray antenna 501*a*, a first edge part 505a is formed in the dielectric material 512*a* and at least partly comprises a metallization 513. For the second subarray antenna 501*b*, a second edge part 504*b* is formed in the dielectric material 512*b* and at least partly comprises a metallization 514.

The locking structure comprises outer lock parts 503*a*, 503*b* and indents 506*a*, 506*b* that are configured in the same way as in the first example. This means that the indents 506*a*, 506*b* and the adjacent outer lock parts 503*b*, 503*a* are adapted to receive each other in a locking configuration, where the outer lock parts 503*b*, 503*a* and the indents 506*a*, 506*b* are electrically conducting and electrically connected to the ground plane 502*a*, 502*b* by means of the metallizations 513, 514.

In the following, features similar to the ones described for the first example will be described, but in a less detailed manner.

According to some aspects and as illustrated in FIG. 5, each subarray antenna 501*a*, 501*b*, 501*c* comprises a first type edge part 504*a*, 504*b*, 504*c* and second type edge part 505*a*, 505*b*, 505*c* in the same way as described for the first example.

Figure 6B:
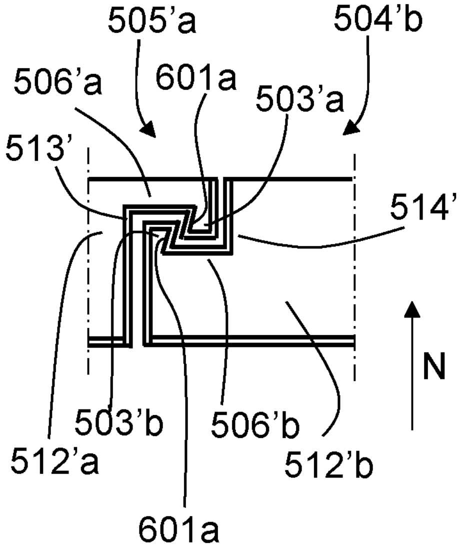
FIG. 6B schematically shows a second type of locking structure for the array antenna according to the second example.

According to some aspects, with reference to FIG. 6B, the edge parts 505'*a*, 504'*b* comprises lock parts 503'*b*, 503'*a* where each outer lock part 503'*b*, 503'*a* comprises a slanted side 601*a*, 601*b* that faces the indent 506'*a*, 506'*b* such that a width of the outer lock part 103'*b*, 103'*a* increases away from the indent 106'*a*, 106'*b* in the same way as described for the first example.

Figure 7:
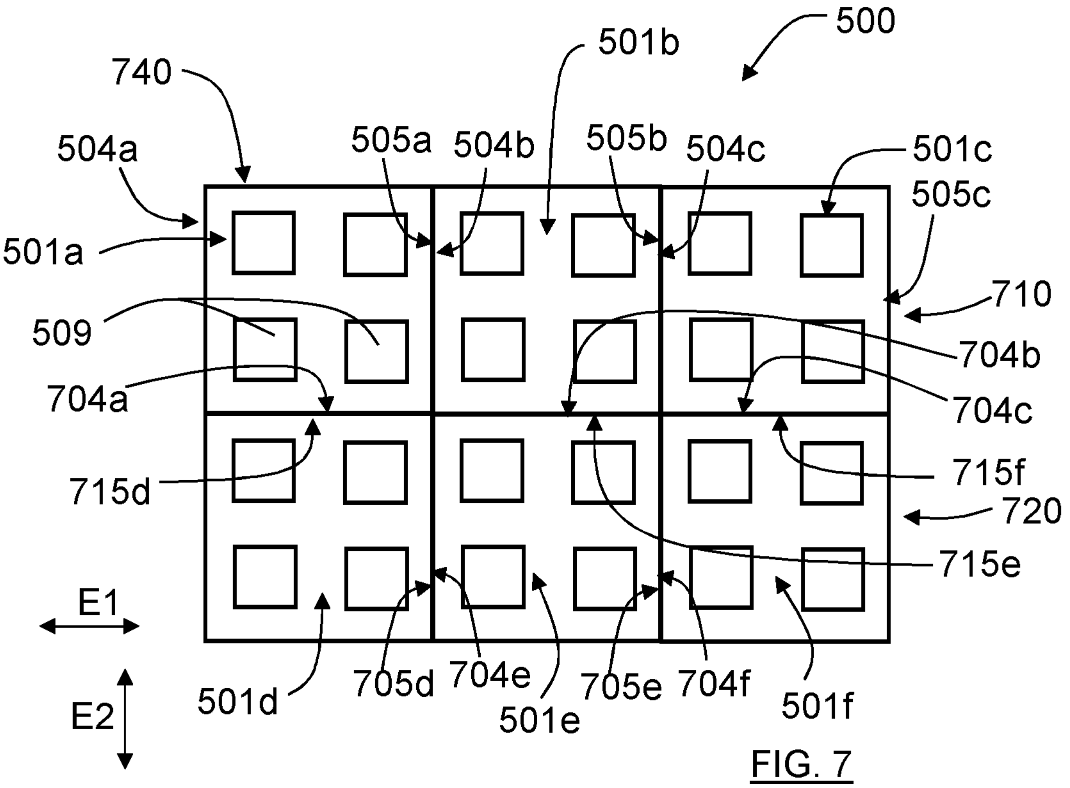
FIG. 7 schematically shows a front view of a first type of the array antenna according to the second example.

As mentioned initially, FIG. 7 shows six subarray antennas 501*a*, 501*b*, 501*c*; 501*d*, 501*e*, 501*f* that form two rows 710, 720 along a second extension E2 with three subarray antennas 501*a*, 501*b*, 501*c*; 501*d*, 501*e*, 501*f* in each row 710, 720. Everywhere where there are adjacent edges, edge parts are connected to each other by means of the locking structures. More in detail, in each row 710, 720, the edge parts 505*a*, 504*b*; 505*b*, 504*c*; 505*d* 504*e*; 505*e*, 504*f* are connected, and the rows 710, 720 are connected to each other by means of corresponding edge parts 704*a*, 715*d*; 704*b*, 715*e*; 704*c*, 715*f*. Especially in the case of the locking structures being of the kind according to FIG. 6B, the edge parts are suitably slid together. For this purpose, according to some aspects, longitudinally running edge parts of rows and columns that form the array antenna 100 have locking parts of the same type such that sliding is admitted.

Figure 8A:
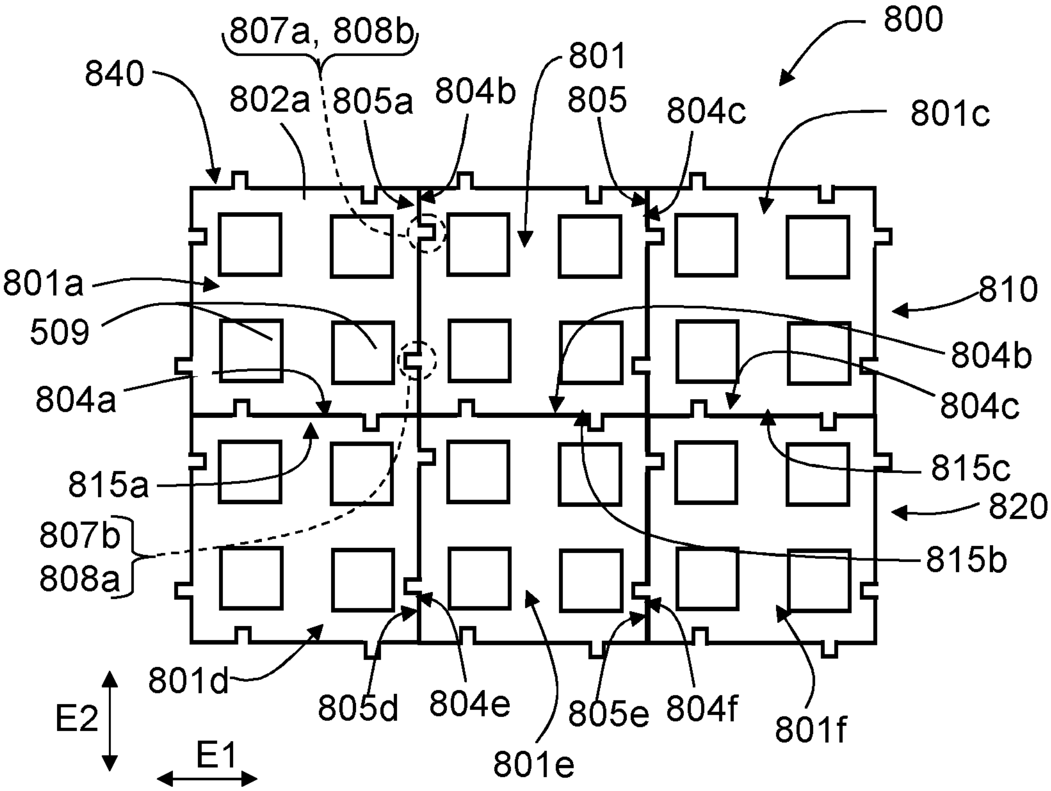
FIG. 8A schematically shows a front view of a second type of the array antenna according to the first example, having co-operating protrusions and notches along the edges.

According to some aspects, with reference to FIG. 8A that mainly corresponds to FIG. 7, there is an alternative array antenna 800. Six subarray antennas 801*a*, 801*b*, 801*c*; 801*d*, 801*e*, 801*f* that form two rows 810, 820 along the second extension E2 with three subarray antennas 801*a*, 801*b*, 801*c*; 801*d*, 801*e*, 801*f* in each row 810, 820. In each row 810, 820, the edge parts 805*a*, 804*b*; 805*b*, 804*c*; 805*d*, 804*e*; 805*e*, 804*f* are connected, and the rows 810, 820 are connected to each other by means of corresponding edge parts 804*a*, 815*d*; 804*b*, 815*e*; 804*c*, 815*f*. In the following, the edge parts 805*a*, 804*b* that connect the first subarray antenna 801*a* to the second subarray antenna 801*b* will be discussed, but of course the same arrangement is applicable for all edge parts.

Figure 8B:
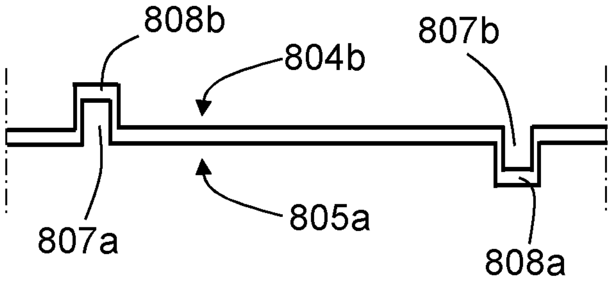
FIG. 8B schematically shows a detail of FIG. 8A, illustrating co-operating protrusions and notches.

With reference also to FIG. 8B, showing a detail of FIG. 8A, according to some aspects, the first edge part 805*a* comprises one protrusion 807*a* that extends away from the edge part and one notch 808*a* that extends in the opposite direction. In the same manner, the second edge part 404*b* comprises one protrusion 807*b* that extends away from the edge part and one notch 808*b* that extends in the opposite direction. The protrusion 807*a*, 807*b* and notches 808*a*, 808*b* are adapted to engage each other in the same manner as in the first example, preventing movements along the first extension E1 and the second extension E2 since the protrusions 807*a*, 807*b* and notches 808*a*, 808*b* locally take the place of the locking structures 503*a*, 503*b*; 506*a*, 506*b* along the edge parts 805*a*, 804*b* and engage each other in an interleaving manner in a direction that is perpendicular to the extension of the edge parts 805*a*, 804*b*.

Figure 9:
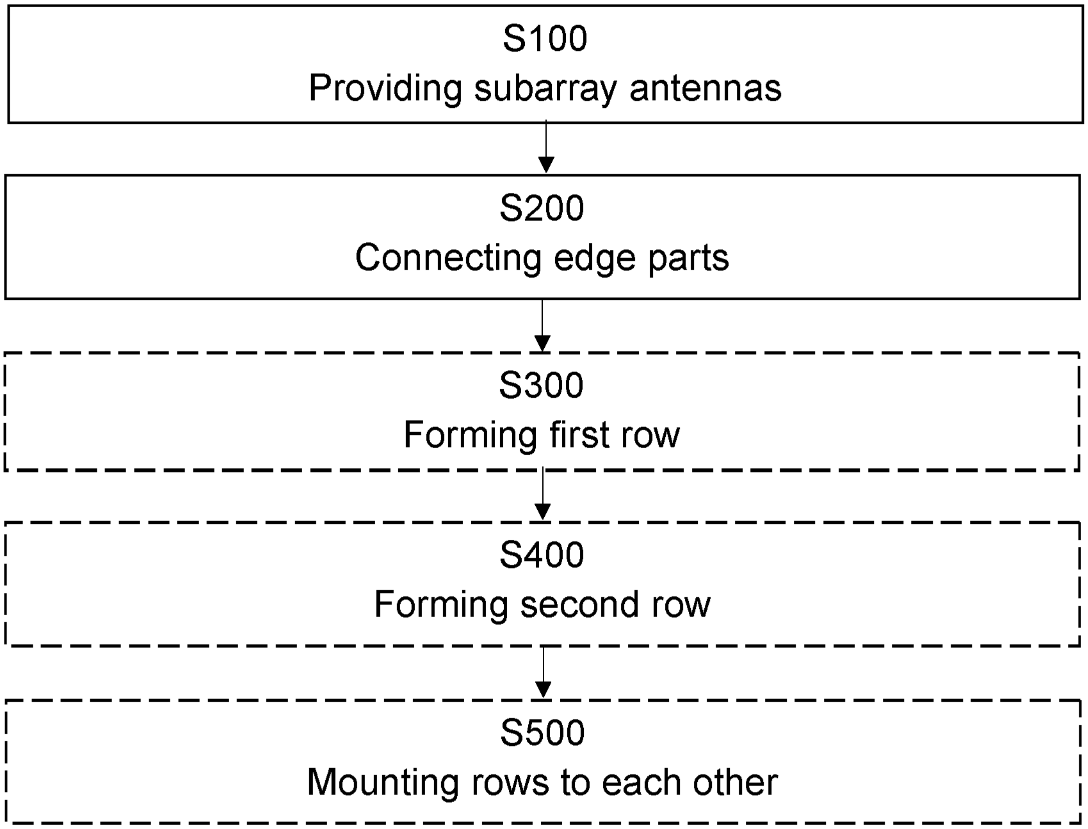
FIG. 9 shows a flowchart for methods according to the present disclosure.

With reference to FIG. 9, the present disclosure also relates to a method for assembling an array antenna 100, where the method comprises providing S100 a first subarray antenna 101*a* and a second subarray antennas 101*b*, each subarray antenna 101*a*, 101*b* comprising a corresponding electrically conducting ground plane 102*a*, 102*b* and connecting S200 a first edge part 105*a* of the first subarray antenna 101*a* to a second edge part 104*b* of the second subarray antenna 101*b* along a first extension E1. Each edge part 105*a*; 104*b* at least partly comprises a locking structure with an outer lock part 103*a*, 103*b* and an indent 106*a*, 106*b* that is positioned between the outer lock part 103*a*, 103*b* and the ground plane 102*a*, 102*b* in a direction of the extension E1. The indent 106*a* of the first edge part 105*a* is used for receiving the outer lock part 103*b* of the second edge part 105*a*, and the outer lock part 103*a* of the first edge part 105*a* is used for engaging the indent 106*b* of the second edge part 105*a*. Each outer lock part 103*b*, 103*a* and each indent 106*a*, 106*b* is electrically conducting and electrically connected to the ground plane 102*a*, 102*b*.

According to some aspects, the method comprises forming S300 a first row 310 of subarray antennas 101*a*, 101*b*, 10*c* by mounting subarray antennas 101*a*, 101*b*, 10*c* to each other along the first extension E1 and forming S400 a second row 320 of subarray antennas 101*d*, 101*e*, 10*f* by mounting subarray antennas 101*d*, 101*e*, 10*f* to each other along the first extension E1. The method further comprises mounting S500 the rows 310, 320 to each other along a second extension E that is perpendicular the first extension E1 by connecting edge parts 304*a*, 304*b*, 304*c* of the first row 310 and edge parts 305*d*, 305*e*, 305*f* of the second row 320 to each other, where each edge part 1304*a*, 304*b*, 304*c*; 305*d*, 305*e*, 305*f* at least partly comprises the locking structure 103*a*, 106*a*; 103*b*, 106*b*.

By forming the rows first, and then mounting the rows to each other, certain edge parts are easier to connect to each other.

The present disclosure is not limited to the above, but may vary freely within the scope the appended claims. For example, according to some aspects, the subarray antennas comprising edge parts and the a locking structure according to the present disclosure, may be any kind of subarray antenna that comprises a ground plane, where the at ground plane can have any form and position, and where the subarray antenna can comprise one or more antenna element of any suitable kind such as the described horn antennas, patch antennas, dipoles, stacked antenna structures, slot antennas etc. A subarray antenna can either be passive or active, and can generally be regarded as a subarray antenna arrangement. A subarray antenna can be adapted to be connected to active circuitry, but can in itself constitute a passive subarray antenna. The subarray antennas 101*a*, 101*b*, 101*c* according to the first example have been regarded as comprising active circuitry in a radio arrangement 113, but could of course be regarded as passive subarray antennas instead, without the radio arrangement 113.

Different types of edge parts can be combined, for example the edge parts described with reference to FIGS. 2B and 6B can be combined with the edge parts described with reference to FIGS. 4A, 4B, 8A and 8B at different edge part at the same subarray antenna. A subarray antenna can have different types of edge parts, for example there can be one or more protrusions and notches at one or more edge parts.

The can also be one or more protrusion and one or more notch at each edge part that is equipped with these elements.

According to some aspects, notches and protrusions can have other geometrical shapes than the rectangular shape shown.

According to some aspects, each locking structure 103*a*, 106*a*; 103*b*, 106*b*; 103'*a*, 106'*a*; 103'*b*, 106'*b*; 503*a*, 506*a*; 503*b*, 506*b*; 503'*a*, 506'*a*; 503'*b*, 506'*b* is hook-shaped.

In particular in the case where protrusion and notches are used, preventing mutual lateral movement of the subarray antennas, when the array antenna 400, 800 is mounted, it can be lifted without falling apart or changing the subarray antennas position by sliding away. Depending of the exact arrangement chosen for an array antenna 100, 400, 500, 800, it can lifted in a SMD machine or with a suction picking tool. The array antenna 100, 400, 500, 800 can be assembled on a standard PCB.

By means of the locking structure, the risk for abrupt height differences in a total array antenna ground plane is mitigated. The total ground plane 130, 530 will be continuous and smooth. In addition, there could be a guiding functionality built into the subarray antennas and/or in the PCB to ensure the alignment of the array antenna 100 becomes perfect versus the PCB 114. This alignment could be done with guiding pins, brackets in the corners or other technics.

By means of the present disclosure, the risk for uncontrolled radiation from an array antenna is reduced since the risk for exciting the edges of the subarray antennas is eliminated. Thereto, the alignment of the subarray antennas will be improved. These features will also help to improve the array antenna radiation pattern. Especially for higher frequencies, the sensitivity for ground plane discontinuations increases and may limit array antenna performance a lot if not taken care of.

Generally, the present disclosure relates to a subarray antenna 101*a*, 101*b*, 101*c* adapted to be mounted to at least one other subarray antenna 101*a*, 101*b*, 101*c* along at least one extension E1, E2 to form an array antenna 100. The subarray antenna 101*a*, 101*b*, 101*c* comprises an electrically conducting ground plane 102*a*, 102*b*, 102*c* and at least one edge part 104*a*, 105*a*; 104*b*, 105*b*; 104*c*, 105*c* that is adapted to face an edge part of an adjacent subarray antenna. The edge part 104*a*, 105*a*; 104*b*, 105*b*; 104*c*, 105*c* at least partly comprises a locking structure comprising an outer lock part 103*a*, 103*b* and an indent 106*a*, 106*b* that is positioned between the outer lock part 103*a*, 103*b* and the ground plane 102*a*, 102*b*, 102*c* in a direction of the extension E1, E2. The indent 106*a*, 106*b* is adapted to receive an adjacent outer lock part 103*b*, 103*a* of an adjacent subarray antenna 101*b*, 101*a*, and the outer lock part 103*b*, 103*a* is adapted to engage an indent 106*b*, 106*a* of an adjacent subarray antenna 101*b*, 101*a*. The outer lock part 103*b*, 103*a* and the indent 106*a*, 106*b* are electrically conducting and electrically connected to the ground plane 102*a*, 102*b*.

According to some aspects, the subarray antenna 101*a*, 101*b*, 101*c* comprises a first type edge part 104*a*, 104*b*, 104*c* and a second type edge part 105*a*, 105*b*, 105*c*, where the first type edge part 104*a*, 104*b*, 104*c* comprises a first type locking structure 103*b*, 106*b* that is adapted to engage a second type locking structure 103*a*, 106*a* that is comprised in the second type edge part 105*a*, 105*b*, 105*c*.

According to some aspects, the outer lock part 103'*b*, 103'*a* comprises a slanted side 201*a*, 201*b* that faces the indent 106'*a*, 106'*b*.

According to some aspects, each edge part 405*a*, 404*b* comprises at least one protrusion 407*a*, 407*b* that extends away from the edge part 405*a*, 04*b* and at least one notch 408*a*, 408*b* that extends in the opposite direction. Each protrusion 407*a*, 407*b* is adapted to engage a corresponding notch 408*a*, 408*b* in an adjacent subarray antenna and each notch 408*a*, 408*b* being adapted to engage a corresponding protrusion 407*a*, 407*b* in an adjacent subarray antenna.

According to some aspects, the ground plane is formed in a piece of metal 102*a*, 102*b*, 102*c*, and where the edge part 104*a*, 105*a*; 104*b*, 105*b*; 104*c*, 105*c* is formed in the same piece of metal.

According to some aspects, the ground plane 502*a*, 502*b*, 502*c* is in the form of a metallization on a dielectric material 512*a*, 512*b*, 512*c*, and where the edge part 504*a*, 505*a*; 504*b*, 505*b*; 504*c*, 505*c* is formed in the dielectric material 512*a*, 512*b*, 512*c* and at least partly comprises a metallization 513, 514'; 513, 514'.

According to some aspects, the subarray antenna 101*a*, 101*b*, 101*c*; 501*a*, 501*b*, 501*c* comprises a plurality of antenna elements 109, 509.

Generally, the present disclosure also relates to an array antenna 100 comprising at least two subarray antennas 101*a*, 101*b*, 101*c*; 101*d*, 101*e*, 101*f* mounted to each other along at least one extension E1, E2. Each subarray antenna 101*a* comprises an electrically conducting ground plane 102*a* and at least one edge part 104*a*, 105*a* that is adapted to face an edge part 104*a*, 105*a* of an adjacent subarray antenna 101*b*. Each edge part 104*a*, 105*a*; 104*b*, 105*b*; 104*c*, 105*c* at least partly comprises a locking structure comprising an outer lock part 103*a*, 103*b* and an indent 106*a*, 106*b* that is positioned between the outer lock part 103*a*, 103*b* and the ground plane 102*a*, 102*b* in a direction of the extension E1, E2. The indent 106*a*, 106*b* is adapted to receive an adjacent outer lock part 103*b*, 103*a* of an adjacent subarray antenna 101*b*, 101*a*, and the outer lock part 103*b*, 103*a* is adapted to engage an indent 106*b*, 106*a* of an adjacent subarray antenna 101*b*, 101*a*. The outer lock part 103*b*, 103*a* and the indent 106*a*, 106*b* are electrically conducting and electrically connected to the ground plane 102*a*, 102*b*.

According to some aspects, each subarray antenna 101*a*, 101*b*, 101*c* comprises a first type edge part 104*a*, 104*b*, 104*c* and a second type edge part 105*a*, 105*b*, 105*c*, where the first type edge part 104*a*, 104*b*, 104*c* comprises a first type locking structure 103*a*, 106*a* that is adapted to engage a second type locking structure 103*b*, 106*b* that is comprised in the second type edge part 104*a*, 104*b*, 104*c*.

According to some aspects, each outer lock part 103*b*, 103*a* comprises a slanted side 201*a*, 201*b* that faces the indent 106*a*, 106*b*, enabling adjacent subarray antennas 101*a*, 101*b*, 101*c* to be locked to each other in a direction N that is normal to an antenna aperture of the array antenna 100.

According to some aspects, each edge part 405*a*, 404*b* comprises at least one protrusion 407*a*, 407*b* that extends away from the edge part 405*a*, 04*b* and at least one notch 408*a*, 408*b* that extends in the opposite direction. Each protrusion 407*a*, 407*b* is adapted to engage a corresponding notch 408*a*, 408*b* in an adjacent subarray antenna and each notch 408*a*, 408*b* is adapted to engage a corresponding protrusion 407*a*, 407*b* in an adjacent subarray antenna, enabling adjacent subarray antennas 101*a*, 101*b*, 101*c* to be locked to each other in a direction along the edge parts 405*a*, 404*b*.

According to some aspects, the ground plane is formed in a piece of metal 102*a*, 102*b*, 102*c*, and where the edge part 104*a*, 105*a*; 104*b*, 105*b*; 104*c*, 105*c* is formed in the same piece of metal.

According to some aspects, the ground plane 502*a*, 502*b*, 502*c* is in the form on a metallization on a dielectric material 512*a*, 512*b*, 512*c*, and where the edge part 504*a*, 505*a*; 504*b*, 505*b*; 504*c*, 505*c* is formed in the dielectric material 512*a*, 512*b*, 512*c* and at least partly comprises a metallization 513, 514; 513', 514'.

According to some aspects, the subarray antenna 101*a*, 101*b*, 101*c*; 501*a*, 501*b*, 501*c* comprises a plurality of antenna elements 109, 509.

The invention claimed is:

1. A first subarray antenna configured to interlock with a second subarray antenna to form an array antenna, the first subarray antenna comprising:
- an electrically conducting ground plane having a main body; and
- a first edge part extending in a first direction from the main body of the electrically conducting ground plane and comprising a locking structure, wherein
  - the locking structure comprises an outer lock part and an indent,
  - the indent is positioned between the outer lock part and the main body of the electrically conducting ground plane,
  - the indent is configured to receive an outer lock part of the second subarray antenna,
  - the outer lock part is configured to engage an indent of the second subarray antenna, and
  - the outer lock part and the indent are electrically conducting and electrically connected to the electrically conducting ground plane.

2. The first subarray antenna of claim 1, wherein the first subarray antenna comprises a first type edge part and a second type edge part, the first type edge part comprises a first type locking structure that is configured to engage a second type locking structure that is comprised in the second type edge part, and the first edge part has the first type edge part.

3. The first subarray antenna of claim 1, wherein the outer lock part of the first edge part comprises a slanted side that faces the indent.

4. The first subarray antenna of claim 1, wherein the electrically conducting ground plane is formed in a piece of metal, and the first edge part is formed in the same piece of metal.

5. The first subarray antenna of claim 1, wherein the electrically conducting ground plane is in the form of a metallization on a dielectric material, and the first edge part is formed in the dielectric material and comprises a metallization.

6. The first subarray antenna of claim 1, wherein the first subarray antenna comprises a plurality of antenna elements.

7. The first subarray antenna of claim 1, wherein the first outer lock part is positioned a first distance in the first direction from the main body, the indent part is positioned a second distance in the first direction from the main body, and the first distance is greater than the second distance.

8. The first subarray antenna of claim 1, wherein the electrically conducting ground plane comprises the first edge part.

9. The first subarray antenna of claim 1, wherein the first edge part is coupled to the electrically conducting ground plane.

10. An array antenna comprising a first subarray antenna mounted to a second subarray antenna, the first subarray antenna comprises a first electrically conducting ground plane having a first main body and a first edge part extending in a first direction from the first main body of the first electrically conducting ground plane, and the second subarray antenna comprises a second electrically conducting ground plane, wherein
- the first edge part of the first subarray antenna comprises a first locking structure,
- the first locking structure comprises a first outer lock part and a first indent that is positioned between the first outer lock part and the first main body of the first electrically conducting ground plane,
- the first indent of the first locking structure of the first subarray antenna is configured to receive a second outer lock part of a second locking structure of the second subarray antenna,
- the first outer lock part of the first locking structure of the first subarray antenna is configured to engage a second indent of the second locking structure of the second subarray antenna, and
- the first outer lock part and the first indent of the first locking structure of the first subarray antenna are electrically conducting and electrically connected to the second electrically conducting ground plane of the second subarray antenna.

11. The array antenna of claim 10, wherein the first subarray antenna comprises a first type edge part and a second type edge part, where the first type edge part comprises a first type locking structure that is configured to engage a second type locking structure that is comprised in the second type edge part, and the first edge part of the first subarray antenna has the first type edge part.

12. The array antenna of claim 10, wherein the first outer lock part of the first subarray antenna comprises a slanted side that faces the first indent of the first locking structure of the first subarray antenna, and the first outer lock part enables the first subarray antenna to be locked in to the second subarray antenna in a direction that is normal to an antenna aperture of the array antenna.

13. The array antenna of claim 10, wherein the first electrically conducting ground plane of the first subarray antenna is formed in a piece of metal, and the first edge part of the first subarray antenna is formed in the same piece of metal.

14. The array antenna of claim 10, wherein the first electrically conducting ground plane of the first subarray antenna is in the form of a metallization on a dielectric material, and the first edge part of the first subarray antenna is formed in the dielectric material and comprises a metallization.

15. The array antenna of claim 10, wherein the first subarray antenna comprises a plurality of antenna elements.

16. A method for assembling an array antenna, wherein the method comprises:

providing a first subarray antenna and a second subarray antenna, the first subarray antenna comprising a first electrically conducting ground plane and the second subarray antenna comprising a second electrically conducting ground plane;

connecting a first edge part of the first subarray antenna to a second edge part of the second subarray antenna along a first extension;

wherein the first edge part comprises a first locking structure with a first outer lock part and a first indent that is positioned between the first outer lock part and a main body of the first electrically conducting ground plane, the second edge part comprises a second locking structure with a second outer lock part and a second indent, the first indent of the first edge part engages the second outer lock part of the second edge part, the first outer lock part of the first edge part engages the second indent of the second edge part, and each outer lock part and each indent is electrically conducting and electrically connected to the corresponding electrically conducting ground plane.

17. The method of claim 16, where in the method comprises:

forming a first row of subarray antennas by mounting subarray antennas to each other along the first extension, wherein the first row of subarray antennas comprises the first and second subarray antennas and the first row of subarray antennas comprise a first set of edge parts, the first set of edge parts comprise the first edge part and the second edge part;

forming a second row of subarray antennas by mounting subarray antennas to each other along the first extension, wherein the second row of subarray antennas comprise a second set of edge parts; and mounting the rows to each other along a second extension that is perpendicular to the first extension by connecting the first set of edge parts and the second set of edge parts to each other, where each edge part of the first and second sets of edge parts comprise the locking structure.

18. A first subarray antenna configured to interlock with a second subarray antenna to form an array antenna, the first subarray antenna comprising:

a first electrically conducting ground plane comprising a first part and a second part, wherein the second part of the first electrically conducting ground plane comprises a first edge part extending in a direction away from the first part of the first electrically conducting ground plane, the first edge part comprises a first locking structure, the first locking structure comprises a first outer lock part and a first indent, the first indent is positioned between the first outer lock part and the first part of the first electrically conducting ground plane, the first indent is configured to receive a second outer lock part of a second ground plane of the second subarray antenna, the first outer lock part is configured to engage a second indent of the second ground plane of the second subarray antenna, and the first locking structure is electrically connected to the first part of the first electrically conducting ground plane.

* * * * *